US012634814B2

(12) United States Patent (10) Patent No.: US 12,634,814 B2
Wu et al. (45) Date of Patent: May 19, 2026

(54) COMMUNICATION METHOD, USER EQUIPMENT AND BASE STATION

(71) Applicant: Samsung Electronics Co., Ltd., Suwon-si (KR)

(72) Inventors: Min Wu, Beijing (CN); Feifei Sun, Beijing (CN); Sa Zhang, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 489 days.

(21) Appl. No.: 18/193,008

(22) Filed: Mar. 30, 2023

(65) Prior Publication Data

US 2023/0328644 A1 Oct. 12, 2023

(30) Foreign Application Priority Data

Mar. 31, 2022 (CN) .......................... 202210346129.2

(51) Int. Cl.
*G08C 17/00* (2006.01)
*H04L 5/00* (2006.01)
*H04W 52/02* (2009.01)
(52) U.S. Cl.
CPC ......... *H04W 52/0206* (2013.01); *H04L 5/005* (2013.01); *H04W 52/0216* (2013.01)
(58) Field of Classification Search
USPC ........................................................ 370/311
See application file for complete search history.

(56) References Cited

U.S. PATENT DOCUMENTS

| | | | |
|---|---|---|---|
| 11,206,115 B2 * | 12/2021 | Qi | ........................ H04L 5/0048 |
| 12,028,805 B2 * | 7/2024 | Ly | ..................... H04W 52/0235 |
| 2009/0170514 A1 | 7/2009 | Yokoyama | |
| 2011/0085611 A1 | 4/2011 | Laroia et al. | |
| 2016/0007406 A1 | 1/2016 | Yi et al. | |
| 2016/0088681 A1 | 3/2016 | Chang et al. | |
| 2017/0033907 A1 | 2/2017 | Guan et al. | |
| 2020/0229244 A1 * | 7/2020 | Yan | ........................ H04W 74/08 |
| 2020/0367167 A1 | 11/2020 | Nam et al. | |
| 2020/0367284 A1 | 11/2020 | Lei et al. | |
| 2022/0078735 A1 * | 3/2022 | Saggar | .................. H04L 27/261 |
| 2023/0007581 A1 * | 1/2023 | Ly | ..................... H04W 52/0235 |

(Continued)

OTHER PUBLICATIONS

International Search Report and Written Opinion dated Jun. 27, 2023, issued in International Patent Application No. PCT/KR2023/004316.

(Continued)

*Primary Examiner* — Chuong T Ho
(74) *Attorney, Agent, or Firm* — Jefferson IP Law, LLP

(57) ABSTRACT

The disclosure relates to a 5G or 6G communication system for supporting a higher data transmission rate. A communication method, a user equipment and a base station are provided. The communication method includes transmitting a request signaling to a base station to request the base station to perform at least one of the following operations, transmitting at least one downlink signal, receiving at least one uplink signal, and entering an active state. In accordance with the embodiments of the disclosure, the influence of the dormancy of the base station on user experience and transmission delay is reduced when the base station enters a dormant state to reduce power consumption.

18 Claims, 6 Drawing Sheets

(56)　　　　　References Cited

U.S. PATENT DOCUMENTS

| | | | |
|---|---|---|---|
| 2023/0043142 A1* | 2/2023 | Ly | H04W 52/0258 |
| 2023/0292143 A1* | 9/2023 | Vivanco | H04W 52/283 |

OTHER PUBLICATIONS

Moderator (Intel Corporation), Discussion Summary #2 for energy saving techniques of NW energy saving SI, R1-2208185, 3GPP TSG RAN WG1 meeting #110, Aug. 28, 2022.
Extended European Search Report dated Jul. 1, 2025, issued in European Patent Application No. 23781411.6.

\* cited by examiner

Transmit a request signal to a base station to request the base station to execute at least one of the following operations: transmitting at least one downlink signal; receiving at least one uplink signal; and entering an active state ~S101

FIG. 4

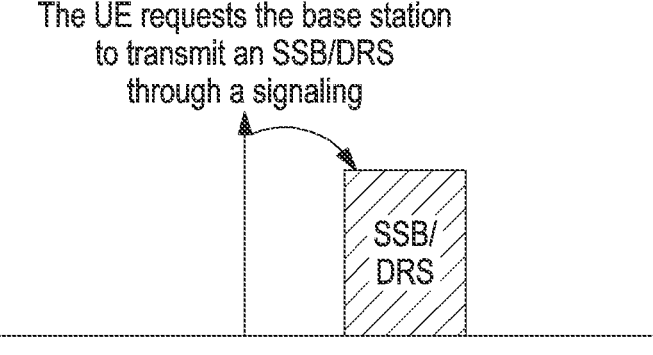

The UE requests the base station to transmit an SSB/DRS through a signaling

SSB/DRS

FIG. 5

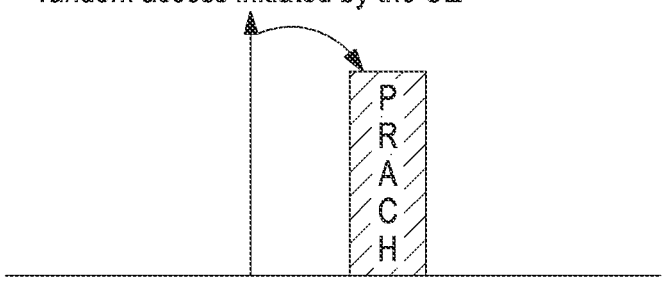

The UE requests, through a signaling, the base station to receive a PRACH and respond to a random access initiated by the UE

PRACH

FIG. 6

The UE requests, through a signaling, the base station to enter the active state and last for a period of time

| The base station is in the dormant state | The base station is in the active state | The base station is in the dormant state |

COMMUNICATION METHOD, USER EQUIPMENT AND BASE STATION

CROSS-REFERENCE TO RELATED APPLICATION(S)

This application is based on and claims priority under 35 U.S.C. § 119 (a) of a Chinese patent application number 202210346129.2, filed on Mar. 31, 2022, in the Chinese Intellectual Property Office, the disclosure of which is incorporated by reference herein in its entirety.

BACKGROUND

1. Field

The disclosure relates to the technical field of wireless communication. More particularly, the disclosure relates to a communication method, a user equipment (UE) and a base station.

2. Description of Related Art 5G mobile communication technologies define broad frequency bands such that high transmission rates and new services are possible, and can be implemented not only in "Sub 6 GHz" bands such as 3.5 GHZ, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with extended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, metamaterial-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

In wireless mobile communication systems, terminal power saving is always an important research direction. Network power saving is also important, and the power consumption of mobile communication base stations accounts for about 60% to 70% of the total power consumption of operators. Therefore, how to reduce the power consumption of communication base stations is of great significance for communication operators to achieve the goal of energy saving and emission reduction.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an apparatus and method for reducing the power consumption of communication base stations.

Additional aspects will be set forth in part in the description which follows and, in part, will be apparent from the description, or may be learned by practice of the presented embodiments.

In accordance with an aspect of the disclosure, a method executed by a UE in a communication system is provided. The method includes transmitting a request signaling to a base station to request the base station to perform at least one of the following operations-transmitting at least one downlink signal, receiving at least one uplink signal, and entering an active state.

Optionally, the base station includes a base station in a dormant state, and the base station in the dormant state includes at least one of the following situations—not transmitting the at least one downlink signal, not receiving the at least one uplink signal, not transmitting downlink signals, and not receiving uplink signals except for the request signaling.

The transmitting of the request signaling to a base station to request the base station to transmit at least one downlink signal includes transmitting a first request signaling to the base station to request the base station to transmit a reference signal for downlink synchronization.

The transmitting of the first request signaling to the base station includes, when there is uplink data arriving at the UE, but the downlink is out of synchronization and the reference signal for downlink synchronization is muted, transmitting the first request signaling to the base station.

Optionally, after a first preset gap of transmitting the first request signaling, it is expected to receive the reference signal for downlink synchronization.

Optionally, the reference signal for downlink synchronization includes at least one of the following-a synchronization signal block (SSB), a discovery reference signal (DRS), the DRS having more physical resource elements used for reference signal mapping than the SSB, and a non-cell defining SSB (NCD-SSB).

Optionally, the reference signal for downlink synchronization being muted is determined based on at least one of the following information-information indicated by the base station regarding that the reference signal for downlink synchronization is muted at a specific occasion, information indicated by the base station regarding that the base station enters a dormant state, the reference signal for downlink synchronization being muted when the base station is in the dormant state, and information of a dormant slot indicated by the base station, the reference signal for downlink synchronization that overlaps with the dormant slot being muted.

Optionally, a first time-domain location of the reference signal for downlink synchronization is determined based on configuration information about the reference signal for downlink synchronization indicated by the base station, and/or, a second time-domain location of the first request signaling is determined based on configuration information about the first request signaling indicated by the base station, and/or, the second time-domain location is determined based on the first time-domain location and a time-domain offset relative to the first time-domain location indicated by the base station, and/or, the first time-domain location is determined based on the second time-domain location and a time-domain offset relative to the second time-domain location indicated by the base station.

Optionally, the request signaling is used for requesting the base station to transmit the reference signal for downlink synchronization in N consecutive cycles, where the N is a positive integer.

The transmitting of the request signaling to a base station to request the base station to receive at least one uplink signal includes transmitting a second request signaling to the base station to request the base station to receive a physical random access channel (PRACH).

The transmitting of the second request signaling to the base station includes, when there is uplink data arriving at the UE but the PRACH is muted, transmitting the second request signaling to the base station.

Optionally, the method further includes, after a second preset gap of transmitting the second request signaling, the PRACH is transmitted to the base station.

Optionally, the PRACH being muted is determined based on at least one of the following information-information indicated by the base station regarding that a periodic PRACH is muted at a specific occasion, information indicated by the base station regarding that the base station enters a dormant state, the PRACH being muted when the base station is in the dormant state, and information of a dormant slot indicated by the base station, the PRACH that overlaps with the dormant slot being muted.

Optionally, a third time-domain location where the base station receives the PRACH is determined based on configuration information about the PRACH indicated by the base station, and/or, a fourth time-domain location of the second request signaling is determined based on configuration information about the second request signaling indicated by the base station, and/or, the fourth time-domain location is determined based on the third time-domain location and a time-domain offset relative to the third time-domain location indicated by the base station, and/or, the third time-domain location is determined based on the fourth time-domain location and a time-domain offset relative to the fourth time-domain location indicated by the base station.

The transmitting of the request signaling to a base station to request the base station to enter an active state includes transmitting a third request signaling to the base station to request the base station to enter the active state, or to request the base station to enter the active state and last for a preset duration of time.

The transmitting of the third request signaling to the base station includes, when there is uplink data arriving at the UE but the base station is in a dormant state, transmitting the third request signaling to the base station.

Optionally, after a third preset gap of transmitting the third request signaling, it is expected that the base station enters the active state.

Optionally, the base station entering the active state performs at least one of the following operations-periodically transmitting the reference signal for downlink synchronization, periodically receiving the PRACH, periodically transmitting a broadcast channel and/or configured unicast channel, and periodically receiving the configured uplink channel.

Optionally, the method further includes, in a preset duration of time, receiving information indicated by the base station regarding that the base station enters the dormant state in advance, and/or in a preset duration of time, receiving information indicated by the base station regarding that the base station will extend the active state.

Optionally, a plurality of resources is configured to transmit the third request signaling, and each resource corresponds to a different length of time duration, and the transmitting a third signaling to the base station includes transmitting the third request signaling to the base station through one of the plurality of resources, to request the base station to enter the active state and last for the duration of time corresponding to the resource.

The transmitting of the request signaling to the base station includes transmitting the request signaling on a primary cell to request the base station to perform at least one of the following operations on a secondary cell-transmitting at least one downlink signal, receiving at least one uplink signal, and entering an active state.

The transmitting of the request signaling to the base station includes at least one of the following ways-transmitting the request signaling to the base station through a physical uplink control channel (PUCCH) and transmitting the request signaling to the base station through a physical signal sequence.

Optionally, the request signaling is configured through system information and/or the request signaling is configured through a UE-specific radio resource control (RRC) signaling.

The transmitting of the request signaling to the base station includes at least one of the following situations, —when there is uplink data arriving at the UE on a preset logical channel, transmitting the request signaling to the base station, when there is uplink data arriving at the UE and the latest available PRACH transmission cannot satisfy a delay requirement of the arrived data, transmitting the request signaling to the base station, and when there is uplink data arriving at the UE and a priority of the arrived data is greater than a priority threshold, transmitting the request signaling to the base station.

Optionally, the method further includes receiving acknowledgment information transmitted by the base station after the request signaling is transmitted to the base station, and expecting at least one of the following situations after a fourth preset gap of receiving the acknowledgment information-receiving at least one downlink signal, transmitting at least one uplink signal, and allowing the base station to enter an active state.

In accordance with another aspect of the disclosure, a method executed by a base station in a communication system is provided. The method includes receiving a request signaling transmitted by a UE, and executing at least one of the following operations-transmitting at least one downlink signal, receiving at least one uplink signal, and entering an active state.

In accordance with another aspect of the disclosure, a user equipment (UE) is provided. The UE includes a transceiver and at least one processor, which is coupled to the transceiver. The UE includes at least one memory storing one or more computer programs configured to be executed by the at least one processor, wherein the one or more computer programs include instructions to: transmit a request signaling to a base station to request the base station to perform at least one of the following operations: transmit at least one downlink signal, receive at least one uplink signal, and enter an active state.

In accordance with another aspect of the disclosure, a base station is provided. The base station includes a transceiver and at least one processor, which is coupled to the transceiver. The base station includes at least one memory storing one or more computer programs configured to be executed by the at least one processor, wherein the one or more computer programs include instructions to: receive a request signaling transmitted by a UE, and execute at least one of the following operations: transmit at least one downlink signal, receive at least one uplink signal, and enter an active state.

In accordance with another aspect of the disclosure, a computer-readable storage medium is provided. The computer-readable storage medium includes computer programs stored thereon that, when executed by a processor, implement the steps of the method executed by a UE according to the disclosure.

In accordance with another aspect of the disclosure, a computer-readable storage medium is provided. The computer-readable storage medium includes computer programs stored thereon that, when executed by a processor, implement the steps of the method executed by a base station according to the disclosure.

In accordance with another aspect of the disclosure, a computer program product is provided. The computer program product includes computer programs that, when executed by a processor, implement the steps of the method executed by a UE according to the disclosure.

In accordance with another aspect of the disclosure, a computer program product is provided. The computer program product includes computer programs that, when executed by a processor, implement the steps of the method executed by a base station according to the disclosure.

In accordance with the communication method, the user equipment and the base station provided in the embodiments of the disclosure, the influence of the dormancy of the base station on user experience and transmission delay is reduced when the base station enters a dormant state to reduce power consumption.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 4 is a flowchart of a method executed by a UE according to an embodiment of the disclosure;

FIG. 5 is a schematic diagram of requesting, by a UE and through a signaling, a base station to transmit a DRS/SSB according to an embodiment of the disclosure;

FIG. 6 is a schematic diagram of requesting, by a UE and through a signaling, a base station to receive a PRACH and respond to a random access process according to an embodiment of the disclosure;

Throughout the drawings, it should be noted that like reference numbers are used to depict the same or similar elements, features, and structures.

DETAILED DESCRIPTION

Figure 1:
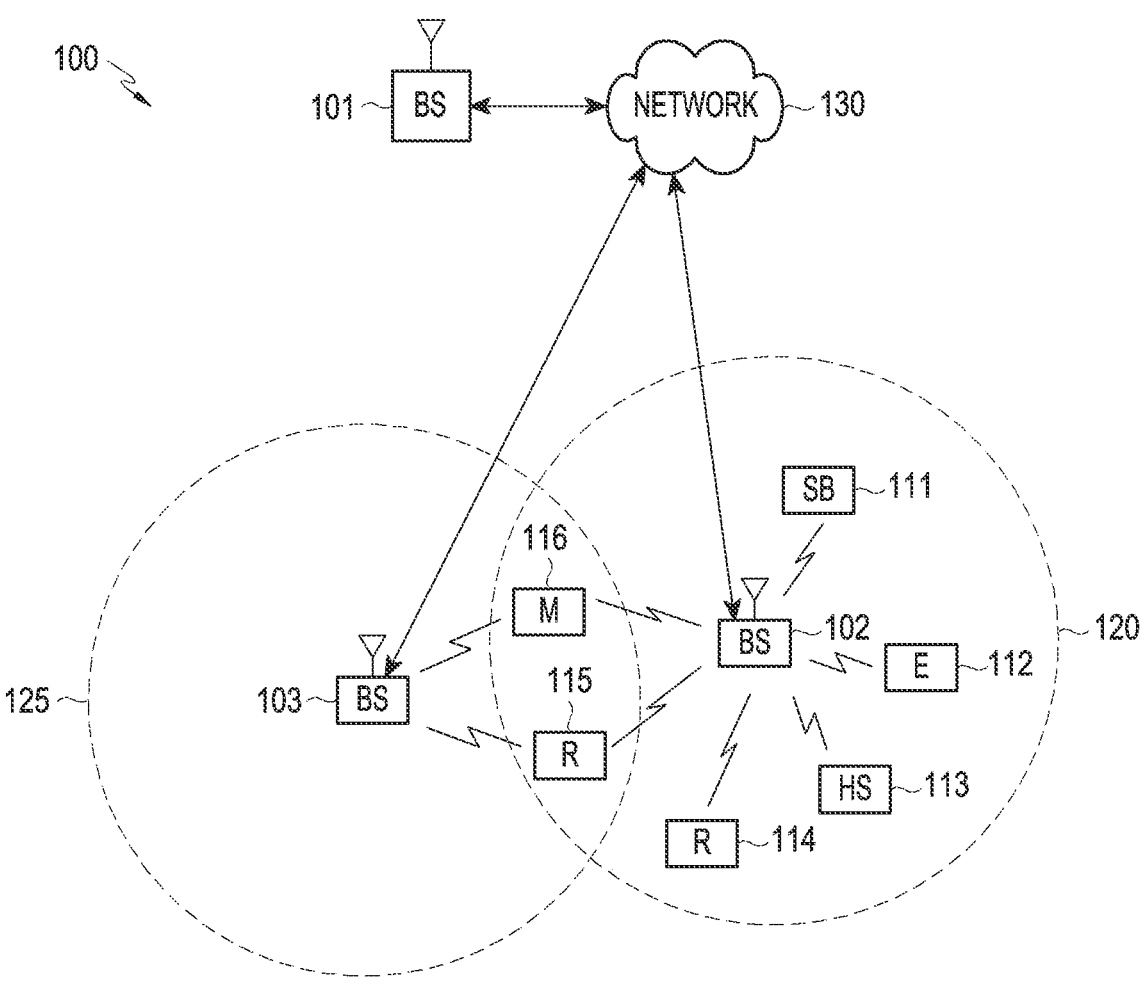
FIG. 1 is a schematic diagram of an overall structure of a wireless network according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein may be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The term "include" or "may include" refers to the existence of a corresponding disclosed function, operation or component which may be used in various embodiments of the disclosure and does not limit one or more additional functions, operations, or components. In addition the terms such as "include" and/or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

The term "or" used in various embodiments of the disclosure includes any or all of combinations of listed words. For example, the expression "A or B" may include A, may include B, or may include both A and B.

Unless defined differently, all terms used herein, which include technical terminologies or scientific terminologies, have the same meaning as that understood by a person skilled in the art to which the disclosure belongs. In addition, such terms as those defined in a generally used dictionary are to be interpreted to have the meanings equal to the contextual meanings in the relevant field of art, and are not to be interpreted to have ideal or excessively formal meanings unless clearly defined in the disclosure.

To make the objects, the technical solutions and the advantages of embodiments of the disclosure more apparent, the technical solutions of the embodiments of the disclosure will be described in detail hereinafter in conjunction with the drawings of the embodiments of the disclosure.

The text and drawings are provided as examples only to help readers understand the disclosure. They are not intended and should not be interpreted as limiting the scope of the disclosure in any way. Additionally, although certain embodiments and examples have been provided, based on the content disclosed herein, it is obvious to those skilled in the art that modifications to the illustrated embodiments and examples can be made without departing from the scope of the disclosure.

FIG. 1 illustrates an example wireless network 100 according to an embodiment of the disclosure. The embodiment of a wireless network 100 shown in FIG. 1 is for illustration only. Other embodiments of a wireless network 100 may be used without departing from the scope of the disclosure.

Referring to FIG. 1, the wireless network 100 includes a gNodeB (gNB) 101, a gNB 102, and a gNB 103. The gNB 101 communicates with the gNB 102 and gNB 103. The gNB 101 also communicates with at least one Internet Protocol (IP) network 130, such as the Internet, a private IP network, or other data network.

Depending on a type of the network, other well-known terms such as "base station" or "access point" may be used instead of "gNodeB" or "gNB". For convenience, the terms "gNodeB" and "gNB" are used in this document to refer to network infrastructure components that provide wireless access for remote terminals. Depending on the type of the network, other well-known terms such as "mobile station", "user station", "remote terminal", "wireless terminal" or "user apparatus" may be used instead of "user equipment" or "UE". For convenience, the terms "user equipment" and "UE" are used in this document to refer to remote wireless devices that wirelessly access the gNB, no matter whether the UE is a mobile device (such as a mobile phone or a smart phone) or a fixed device (such as a desktop computer or a vending machine).

In an embodiment, the gNB 102 provides wireless broadband access to the network 130 for a plurality of first User Equipments (UEs) within a coverage area 120 of gNB 102. The plurality of first UEs include a UE 111, which may be located in a Small Business (SB); a UE 112, which may be located in an enterprise (E); a UE 113, which may be located in a Wi-Fi Hotspot (HS); a UE 114, which may be located in a first residence (R); a UE 115, which may be located in a second residence (R); a UE 116, which may be a mobile device (M), such as a cellular phone, a wireless laptop computer, a wireless PDA, etc. In another embodiment, the gNB 103 provides wireless broadband access to the network 130 for a plurality of second UEs within the coverage area 125 of the gNB 103. The plurality of second UEs include a UE 115 and a UE 116. In some embodiments, one or more of gNBs 101-103 may communicate with each other and with UEs 111-116 using 5G, Long Term Evolution (LTE), LTE advanced (LTE-A), worldwide interoperability for microwave access (WiMAX) or other advanced wireless communication technologies.

In an example, the dashed lines show approximate ranges of the coverage areas 120 and 125, and the ranges are shown as approximate circles merely for illustration and explanation purposes. It should be clearly understood that the coverage areas associated with the gNBs, such as the coverage areas 120 and 125, may have other shapes, including irregular shapes, depending on configurations of the gNBs and changes in the radio environment associated with natural obstacles and man-made obstacles.

As will be described in more detail below, one or more of gNB 101, gNB 102, and gNB 103 include a two dimensional (2D) antenna array as described in embodiments of the disclosure. In some embodiments, one or more of gNB 101, gNB 102, and gNB 103 support codebook designs and structures for systems with 2D antenna arrays.

Although FIG. 1 illustrates an example of a wireless network 100, it may make various changes to FIG. 1. In an embodiment, the wireless network 100 may include any number of gNBs and any number of UEs in any suitable arrangement, for example. Furthermore, gNB 101 may directly communicate with any number of UEs and provide wireless broadband access to the network 130 for those UEs. Similarly, each gNB 102-103 may directly communicate with the network 130 and provide direct wireless broadband access to the network 130 for the UEs. In another embodiment, gNB 101, 102 and/or 103 may provide access to other or additional external networks, such as external telephone networks or other types of data networks.

Figures 2A, 2B:
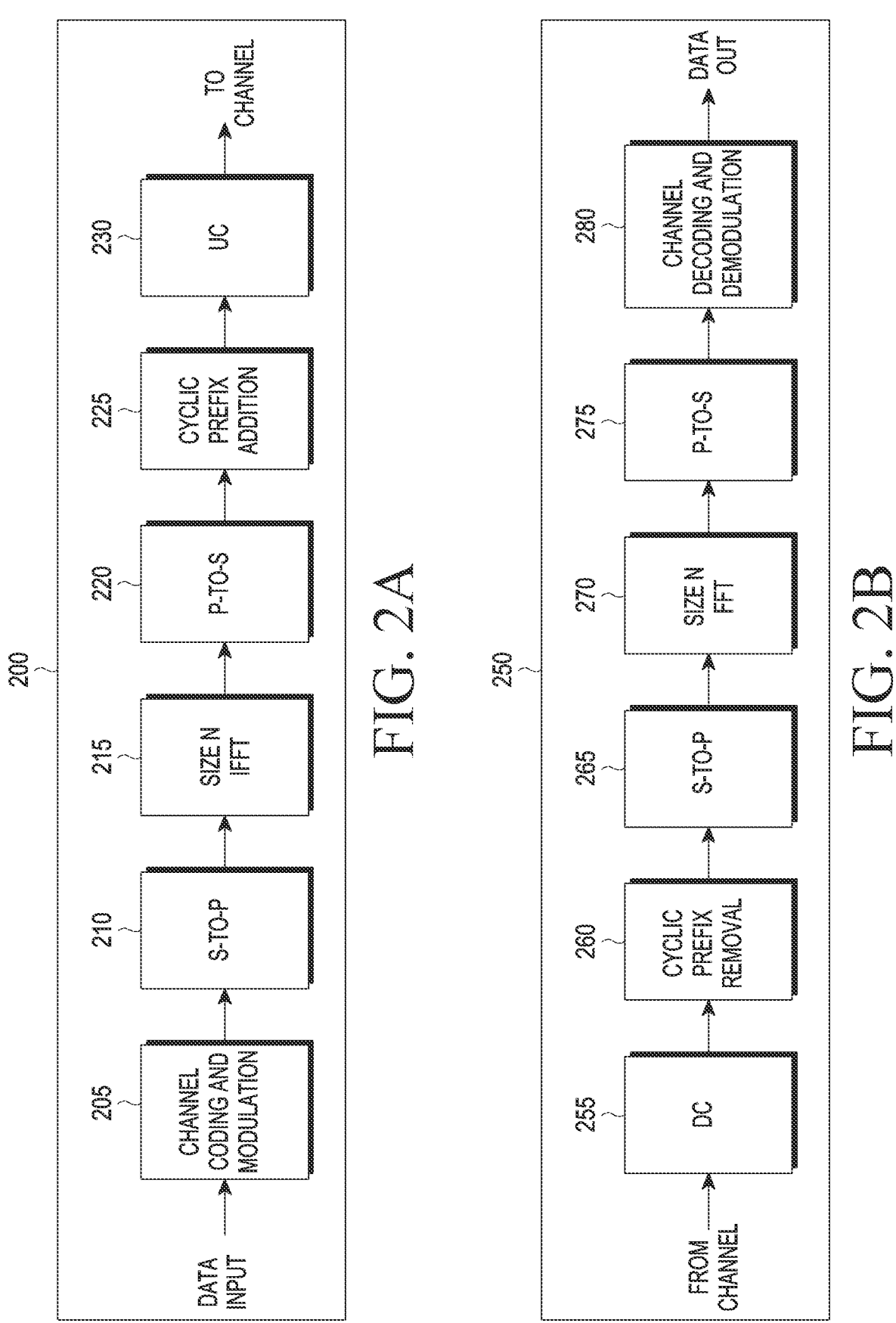
FIG. 2A is a schematic diagram of a transmission path according to an embodiment of the disclosure.
FIG. 2B is a schematic diagram of a reception path according to an embodiment of the disclosure.

FIGS. 2A and 2B illustrate example wireless transmission and reception paths according to various embodiments of the disclosure. In an embodiment, the transmission path 200 can be described as being implemented in a gNB, such as gNB 102, and the reception path 250 can be described as being implemented in a UE, such as UE 116. However, it should be understood that the reception path 250 may be implemented in a gNB and the transmission path 200 may be implemented in a UE. In embodiments of the disclosure, the reception path 250 is configured to support codebook designs and structures for systems with 2D antenna arrays as described in embodiments of the disclosure.

Referring to FIGS. 2A and 2B, a transmission path 200 includes a channel coding and modulation block 205, a Serial-to-Parallel (S-to-P) block 210, a size N Inverse Fast Fourier Transform (IFFT) block 215, a Parallel-to-Serial (P-to-S) block 220, a cyclic prefix addition block 225, and an up-converter (UC) 230. In another embodiment, a reception path 250 includes a down-converter (DC) 255, a cyclic prefix removal block 260, a Serial-to-Parallel (S-to-P) block 265, a size N Fast Fourier Transform (FFT) block 270, a Parallel-to-Serial (P-to-S) block 275, and a channel decoding and demodulation block 280.

In the transmission path 200, the channel coding and modulation block 205 receives a set of information bits, applies coding (such as Low Density Parity Check (LDPC) coding), and modulates the input bits (such as using Quadrature Phase Shift Keying (QPSK) or Quadrature Amplitude Modulation (QAM)) to generate a sequence of frequency-domain modulated symbols. In an embodiment, the Serial-to-Parallel (S-to-P) block 210 converts (such as demultiplexes) serial modulated symbols into parallel data to generate N parallel symbol streams, where N is a size of the IFFT/FFT used in gNB 102 and UE 116. The size N IFFT block 215 performs IFFT operations on the N parallel symbol streams to generate a time-domain output signal. In another embodiment, the Parallel-to-Serial block (P-to-S) 220 converts (such as multiplexes) parallel time-domain output symbols from the Size N IFFT block 215 to generate a serial time-domain signal. In still another embodiment, the cyclic prefix addition block 225 inserts a cyclic prefix into the time-domain signal. In yet another embodiment, the up-converter 230 modulates (such as up-converts) the output of the cyclic prefix addition block 225 to a radio frequency (RF) frequency for transmission via a wireless channel. The signal may also be filtered at a baseband before switching to the RF frequency.

The RF signal transmitted from gNB 102 arrives at UE 116 after passing through the wireless channel, and operations in reverse to those at gNB 102 are performed at UE 116. In an embodiment, the down-converter 255 down-converts the received signal to a baseband frequency, and the cyclic prefix removal block 260 removes the cyclic prefix to generate a serial time-domain baseband signal. In an embodiment, the Serial-to-Parallel block 265 converts the time-domain baseband signal into a parallel time-domain signal. The Size N FFT block 270 performs an FFT algorithm to generate N parallel frequency-domain signals. In still another embodiment, the Parallel-to-Serial block 275 converts the parallel frequency-domain signal into a sequence of modulated data symbols. The channel decoding and demodulation block 280 demodulates and decodes the modulated symbols to recover the original input data stream.

Each of gNBs 101-103 may implement a transmission path 200 similar to that for transmitting to UEs 111-116 in the downlink, and may implement a reception path 250 similar to that for receiving from UEs 111-116 in the uplink. Each of UEs 111-116 may implement a transmission path 200 for transmitting to gNBs 101-103 in the uplink, and may implement a reception path 250 for receiving from gNBs 101-103 in the downlink.

Each of the components in FIGS. 2A and 2B can be implemented using only hardware, or using a combination of hardware and software/firmware. As a specific example, at least some of the components in FIGS. 2A and 2B may be implemented in software, while other components may be implemented in configurable hardware or a combination of software and configurable hardware. In an example, the FFT block 270 and IFFT block 215 may be implemented as configurable software algorithms, in which the value of the size N may be modified according to the implementation.

Although described as using FFT and IFFT, this is only illustrative and should not be interpreted as limiting the scope of the disclosure. Other types of transforms may be used, such as Discrete Fourier transform (DFT) and Inverse Discrete Fourier Transform (IDFT) functions. It should be understood that for DFT and IDFT functions, the value of variable N may be any integer (such as 1, 2, 3, 4, etc.), while for FFT and IFFT functions, the value of variable N may be any integer which is a power of 2 (such as 1, 2, 4, 8, 16, etc.).

Although FIGS. 2A and 2B illustrate examples of wireless transmission and reception paths, various changes may be made to FIGS. 2A and 2B. For example, various components in FIGS. 2A and 2B may be combined, further subdivided or omitted, and additional components may be added according to specific requirements. Furthermore, FIGS. 2A and 2B are intended to illustrate examples of types of transmission and reception paths that may be used in a wireless network. Any other suitable architecture may be used to support wireless communication in a wireless network.

Figure 3A:
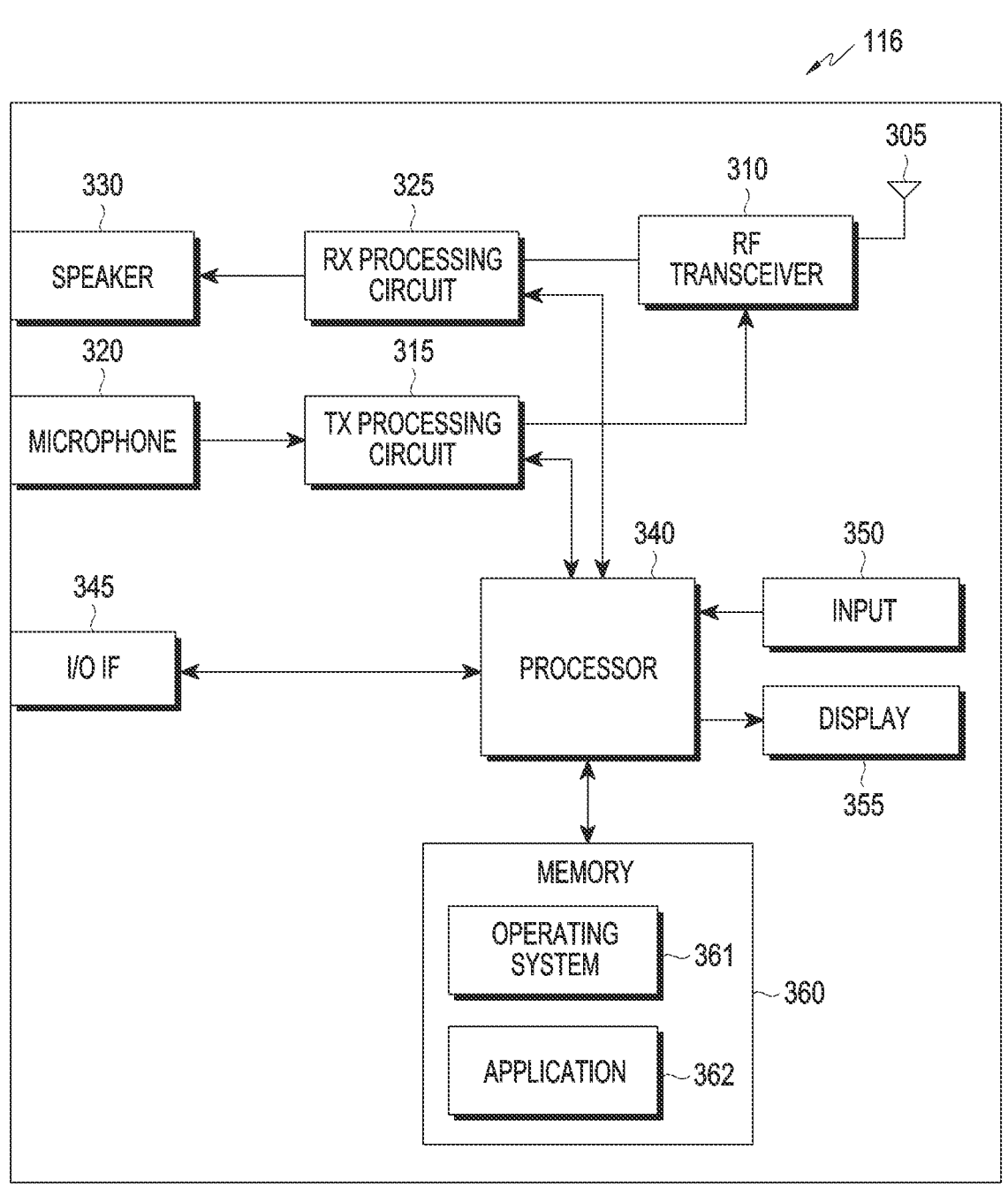
FIG. 3A is a schematic structure diagram of a UE according to an embodiment of the disclosure.

FIG. 3A illustrates an example UE 116 according to an embodiment of the disclosure. The embodiment of an example UE 116 shown in FIG. 3A is for illustration only, and UEs 111-115 of FIG. 1 can have the same or similar configuration. However, a UE has various configurations, and FIG. 3A does not limit the scope of the disclosure to any specific implementation of the UE.

Referring to FIG. 3A, UE 116 includes an antenna 305, a radio frequency (RF) transceiver 310, a transmission (TX) processing circuit 315, a microphone 320, and a reception (RX) processing circuit 325. UE 116 also includes a speaker 330, a processor/controller 340, an input/output (I/O) interface (IF) 345, an input device(s) 350, a display 355, and a memory 360. The memory 360 includes an operating system (OS) 361 and one or more applications 362.

In an embodiment, the RF transceiver 310 receives an incoming RF signal transmitted by a gNB of the wireless network 100 from the antenna 305. In another embodiment, the RF transceiver 310 down-converts the incoming RF signal to generate an intermediate frequency (IF) or baseband signal. In yet another embodiment, the IF or baseband signal is transmitted to the RX processing circuit 325, where the RX processing circuit 325 generates a processed baseband signal by filtering, decoding and/or digitizing the baseband or IF signal. In still another embodiment, the RX processing circuit 325 transmits the processed baseband signal to speaker 330 (such as for voice data) or to processor/controller 340 for further processing (such as for web browsing data).

The TX processing circuit 315 receives analog or digital voice data from microphone 320 or other outgoing baseband data (such as network data, email or interactive video game data) from processor/controller 340. In an embodiment, the TX processing circuit 315 encodes, multiplexes, and/or digitizes the outgoing baseband data to generate a processed baseband or IF signal. In another embodiment, the RF transceiver 310 receives the outgoing processed baseband or IF signal from the TX processing circuit 315 and up-converts the baseband or IF signal into an RF signal transmitted via the antenna 305.

In yet another embodiment, the processor/controller 340 may include one or more processors or other processing devices and execute an OS 361 stored in the memory 360 in order to control the overall operation of UE 116. For example, the processor/controller 340 may control the reception of forward channel signals and the transmission of backward channel signals through the RF transceiver 310, the RX processing circuit 325 and the TX processing circuit 315 according to well-known principles. In some embodiments of the disclosure, the processor/controller 340 includes at least one microprocessor or microcontroller.

The processor/controller 340 is also capable of executing other processes and programs residing in the memory 360, such as operations for channel quality measurement and reporting for systems with 2D antenna arrays as described in embodiments of the disclosure. In another embodiment, the processor/controller 340 may move data into or out of the memory 360 as required by an execution process. In some embodiments, the processor/controller 340 is configured to execute the application 362 based on the OS 361 or in response to signals received from the gNB or the operator. In yet another embodiment, the processor/controller 340 is also coupled to an I/O interface 345, where the I/O interface 345 provides UE 116 with the ability to connect to other devices such as laptop computers and handheld computers. I/O interface 345 is a communication path between these accessories and the processor/controller 340.

In an embodiment, the processor/controller 340 is also coupled to the input device(s) 350 and the display 355. An operator of UE 116 may input data into UE 116 using the input device(s) 350. In another embodiment, the display 355 may be a liquid crystal display or other display capable of presenting text and/or at least limited graphics (such as from a website). The memory 360 is coupled to the processor/controller 340. A part of the memory 360 may include a random access memory (RAM), while another part of the memory 360 may include a flash memory or other read-only memory (ROM).

Although FIG. 3A illustrates an example of UE 116, various changes can be made to FIG. 3A. In an example, various components in FIG. 3A can be combined, further subdivided or omitted, and additional components may be added according to specific requirements. As a another example, the processor/controller 340 may be divided into a plurality of processors, such as one or more central processing units (CPUs) and one or more graphics processing units (GPUs). Furthermore, although FIG. 3A illustrates that the UE 116 is configured as a mobile phone or a smart phone, UEs may be configured to operate as other types of mobile or fixed devices.

Figure 3B:
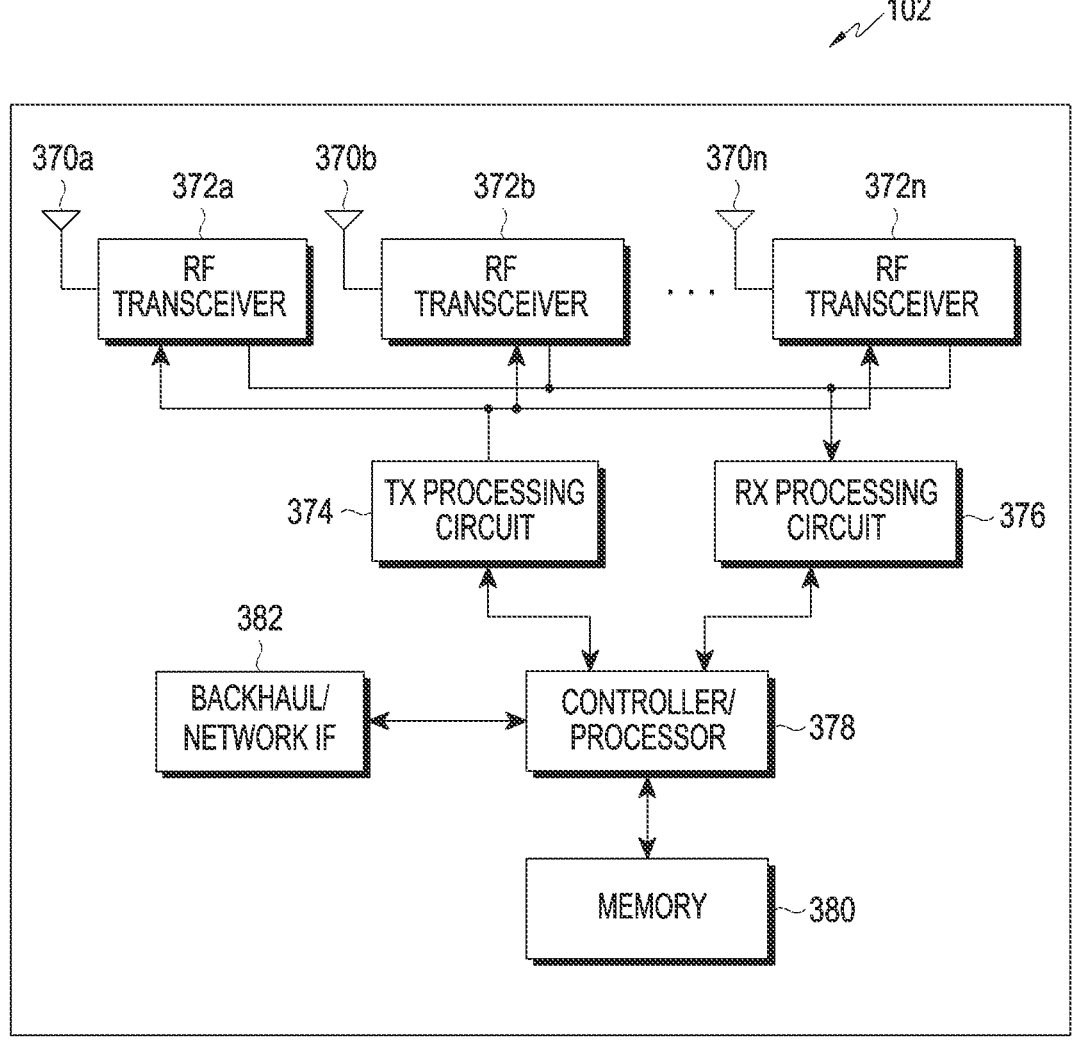
FIG. 3B is a schematic structure diagram of a base station according to an embodiment of the disclosure.

FIG. 3B illustrates an example gNB 102 according to an embodiment of the disclosure. The embodiment of gNB 102 shown in FIG. 3B is for illustration only, and other gNBs of FIG. 1 can have the same or similar configuration. However, a gNB has various configurations, and FIG. 3B does not limit the scope of the disclosure to any specific implementation of a gNB. It should be noted that gNB 101 and gNB 103 may include the same or similar structures as gNB 102.

Referring to FIG. 3B, gNB 102 includes a plurality of antennas 370a-370n, a plurality of RF transceivers 372a-372n, a transmission (TX) processing circuit 374, and a reception (RX) processing circuit 376. In some embodiments, one or more of the plurality of antennas 370a-370n include a 2D antenna array. gNB 102 also includes a controller/processor 378, a memory 380, and a backhaul or network interface 382.

In an embodiment, RF transceivers 372a-372n receive an incoming RF signal from antennas 370a-370n, such as a signal transmitted by UEs or other gNBs. RF transceivers 372a-372n down-convert the incoming RF signal to generate an IF or baseband signal. In another embodiment, the IF or baseband signal is transmitted to the RX processing circuit 376, where the RX processing circuit 376 generates a processed baseband signal by filtering, decoding and/or digitizing the baseband or IF signal. RX processing circuit 376 transmits the processed baseband signal to controller/processor 378 for further processing.

In still another embodiment, the TX processing circuit 374 receives analog or digital data (such as voice data, network data, email or interactive video game data) from the controller/processor 378. TX processing circuit 374 encodes, multiplexes and/or digitizes outgoing baseband data to generate a processed baseband or IF signal. RF transceivers 372a-372n receive the outgoing processed baseband or IF signal from TX processing circuit 374 and up-convert the baseband or IF signal into an RF signal transmitted via antennas 370a-370n.

In yet another embodiment, the controller/processor 378 may include one or more processors or other processing devices that control the overall operation of gNB 102. For example, the controller/processor 378 may control the reception of forward channel signals and the transmission of backward channel signals through the RF transceivers 372a-372n, the RX processing circuit 376 and the TX processing circuit 374 according to well-known principles. The controller/processor 378 may also support additional functions, such as higher-level wireless communication functions. In an example, the controller/processor 378 may perform a Blind Interference Sensing (BIS) process such as that performed through a BIS algorithm, and decode a received signal from which an interference signal is subtracted. A controller/processor 378 may support any of a variety of other functions in gNB 102. In some embodiments, the controller/processor 378 includes at least one microprocessor or microcontroller.

In an embodiment, the controller/processor 378 is also capable of executing programs and other processes residing in the memory 380, such as a basic OS. The controller/processor 378 may also support channel quality measurement and reporting for systems with 2D antenna arrays as described in embodiments of the disclosure. In embodiments of the disclosure, the controller/processor 378 supports communication between entities such as web real-time communications (RTCs). The controller/processor 378 may move data into or out of the memory 380 as required by an execution process.

In another embodiment, the controller/processor 378 is also coupled to the backhaul or network interface 382. The backhaul or network interface 382 allows gNB 102 to communicate with other devices or systems through a backhaul connection or through a network. The backhaul or network interface 382 may support communication over any suitable wired or wireless connection(s). In an example, when gNB 102 is implemented as a part of a cellular communication system, such as a cellular communication system supporting 5G or new radio access technology or new radio (NR), LTE or LTE-A, the backhaul or network interface 382 may allow gNB 102 to communicate with other gNBs through wired or wireless backhaul connections. When gNB 102 is implemented as an access point, the backhaul or network interface 382 may allow gNB 102 to communicate with a larger network, such as the Internet, through a wired or wireless local area network or through a wired or wireless connection. The backhaul or network interface 382 includes any suitable structure that supports communication through a wired or wireless connection, such as an Ethernet or an RF transceiver.

In still another embodiment, the memory 380 is coupled to the controller/processor 378. A part of the memory 380 may include an RAM, while another part of the memory 380 may include a flash memory or other ROMs. In certain embodiments, a plurality of instructions, such as the BIS algorithm, are stored in the memory. The plurality of instructions is configured to cause the controller/processor 378 to execute the BIS process and decode the received signal after subtracting at least one interference signal determined by the BIS algorithm.

As will be described in more detail below, the transmission and reception paths of gNB 102 (implemented using RF transceivers 372a-372n, TX processing circuit 374 and/or RX processing circuit 376) support aggregated communication with frequency-division duplexing (FDD) cells and time-division duplexing (TDD) cells.

Although FIG. 3B illustrates an example of a gNB 102, it may make various changes to FIG. 3B. For example, gNB 102 may include any number of respective components shown in FIG. 3A. As a specific example, the access point may include many backhaul or network interfaces 382, and the controller/processor 378 may support routing functions to route data between different network addresses. In another example, although shown as including a single instance of the TX processing circuit 374 and a single instance of the RX processing circuit 376, gNB 102 may include multiple instances of each (such as one for each RF transceiver).

In a wireless communication system, to reduce the power consumption of a base station, the base station may periodically enter a dormant state, that is, the base station neither transmits any downlink signal/channel nor receives any uplink signal/channel. By reducing the power consumption of the base station, the heating quantity of the device may be reduced, the power consumption of the corresponding air conditioner may be correspondingly reduced, so that the electricity bill of the operator is reduced.

However, the dormancy of the base station has a certain impact on user experience and transmission delay, so the embodiments of the disclosure provide related solutions.

The technical solutions in the embodiments of the disclosure and the technical effects achieved by the technical solutions of the disclosure will be explained below by describing several implementations. It should be noted that the following embodiments can be cross-referenced, borrowed or combined with each other, and the description of the same terms, similar features and similar implementation steps, etc., in different embodiments will not be repeated.

FIG. 4 provides a method executed by a UE according to an embodiment of the disclosure.

Referring to FIG. 4, the method includes the following.

At operation S101, a request signaling is transmitted to a base station to request the base station to execute at least one of the following operations: transmitting at least one downlink signal; receiving at least one uplink signal; and entering an active state.

In one embodiment of the disclosure, the base station may include, but not limited to, a base station in a dormant state. The base station in the dormant state includes at least one of the following situations: not transmitting the at least one downlink signal; not receiving the at least one uplink signal; not transmitting downlink signals; and not receiving uplink signals except for the request signaling.

Herein, the signal may be signals in the communication system, or may be any information that needs to be transferred by two or more parties of the information in the communication system in a broad sense. In an example, the signal may include signals, channels or the like in the communication system. The signal in the disclosure may refer to signals or channels, or may include both signals and channels. Similarly, the downlink signal may refer to downlink signals and/or channels, and the uplink signal may refer to uplink signals and/or channels. Hereinafter, for convenience of description, signals and/or channels may also be referred to as signals/channels, that is, "/" and "and/or" may be interchangeable. That is, signals/channels may include signals, or channels, or signals and channels.

In another embodiment of the disclosure, when a UE has a communication demand, the UE may wake up the dormant base station through a request signaling, to request the base station to enter an active state, transmit a specific downlink signal or receive a specific uplinks signal, so that a good balance between the dormancy of the base station and the user experience is achieved.

As one example, when there is uplink data arriving at the UE but the downlink is out of synchronization, the UE may transmit a request signaling to the base station to request the dormant base station to transmit a reference signal for downlink synchronization, e.g., a discovery reference signal (DRS) and/or a synchronization signal block (SSB), etc.; and when there is uplink data arriving at the UE but the physical random access channel (PRACH) transmission is muted, the UE may transmit a request signaling to the base station to request the dormant base station to respond to a random access process initiated by the UE.

It should be understood by those skilled in the art that the above operations that the dormant base station is requested to be performed are just examples, and in practical applications, the content that the UE can request is not limited thereto.

In yet another embodiment of the disclosure, the request signaling for waking up the dormant base station may also be referred to as, but not limited to, a wake up signal (WUS), a request signal (RS), etc. Other names are also possible.

In still another embodiment of the disclosure, the transmitting a request signaling to the base station includes at least one of the following ways: transmitting the request signaling to the base station through a physical uplink control channel (PUCCH); and transmitting the request signaling through a physical signal sequence. The request signal transmitted to the base station by the UE may be carried by the existing PUCCH, for example, the existing PUCCH being in a format of 0, or may be carried by a newly defined physical signal sequence. The advantage of carrying the request signaling through the physical signal sequence is that the base station may monitor the request signaling at lower power consumption, so that the balance between the dormancy of the base station and the user experience may be achieved at lower power consumption.

In an embodiment of the disclosure, the base station in the dormant state periodically monitors the request signaling that may be transmitted by the UE. In addition to this, the base station may not transmit any downlink signal/channel, and/or may not receive any uplink signal/channel. If the base station monitors the request signaling transmitted by the UE, the base station executes at least one of the following operations: transmitting at least one downlink signal, receiving at least one uplink signal, and entering an active state.

In another embodiment of the disclosure, the UE may request the base station to transmit a specific downlink signal and/or channel through a request signaling.

When there is uplink data arriving at the UE, but the downlink is out of synchronization and the reference signal for downlink synchronization is muted, the UE transmits a first request signaling to the base station to request the base station to transmit the reference signal for downlink synchronization, and expects to receive the reference signal for downlink synchronization after a first preset gap of transmitting the first request signaling.

In yet another embodiment of the disclosure, the reference signal for downlink synchronization includes at least one of the following: an SSB, a DRS, a non-cell defining SSB (NCD-SSB), etc.

In an embodiment, the SSB includes a primary synchronization signal (PSS), a secondary synchronization signal (SSS), a physical broadcast channel (PBCH), etc. In practical applications, the PSS occupies one symbol, the SSS occupies one symbol, and the PBCH occupies two symbols.

In another embodiment, the DRS is a newly defined reference signal, which is mainly used for the UE to quickly achieve downlink synchronization in a short time through energy accumulation. The DRS has more physical resource elements used for reference signal mapping than the SSB. That is, the DRS may have more physical resource elements used for reference signal mapping than the SSB. In an example, compared with the SSB, the DRS occupies a larger bandwidth and/or lasts for a longer time, and/or the reference signals of the DRS is denser in time domain and/or frequency domain, etc. When the UE cannot achieve the accuracy of downlink synchronization by receiving the SSB one time, the DRS may avoid the situation where the downlink synchronization may be achieved by continuously receiving the SSB in multiple cycles, so that the UE may quickly achieve downlink synchronization only when the base station centrally transmits the reference signal one time, and the effect of greatly reducing the power consumption of the base station and the UE is achieved.

In practical applications, there are two types of SSBs. One type is cell defining SSBs (CD-SSBs), which carry associated configuration information of CORESET #0 and configuration information of the monitoring occasion of Type0-physical downlink control channel (PDCCH) common search space (CSS). The UE can receive a system information block 1 (SIB1) according to CORESET #0 and Type0-PDCCH CSS, and then obtain the minimum system information required to access the wireless network. The other type is NCD-SSBs, which do not carry configuration information of CORESET #0 and are mainly used for radio resource management (RRM). The UE may obtain RRM measurement by measuring the reference signal in the CD-SSB or CD-SSB, to support UE mobility management.

Optionally, the UE requests through the request signaling that the SSB transmitted by the base station is only NCD-SSB, thus advantageously avoiding affecting the legacy UE (the old version of the UE) of the system.

FIG. 5 is a schematic diagram of requesting, by a UE and through a signaling, a base station to transmit a DRS/SSB according to an embodiment of the disclosure.

In one embodiment of the disclosure, if there is uplink data arriving at the UE and the downlink is out of synchronization, the UE must achieve downlink synchronization before connection establishment. When the UE cannot achieve downlink synchronization in time to receive a random access response since the base station is dormant and cannot transmit the SSB/DRS or the period of the SSB/DRS transmitted by the base station is too sparse, referring to FIG. 5, the UE may wake up the dormant base station through a signaling (e.g., the first request signaling) to request the base station to transmit a DRS and/or SSB for synchronization. Upon transmitting the first request signaling, the UE may expect to receive the corresponding DRS/SSB to achieve downlink synchronization (e.g., after a first preset gap of transmitting the first request signaling). The base station will transmit the corresponding DRS/SSB after monitoring the first request signaling.

In another embodiment of the disclosure, the reference signal for downlink synchronization being muted is determined based on at least one of the following information.

(1) Information indicated by the base station regarding that the reference signal for downlink synchronization is muted at a specific occasion.

In an example, based on the information indicated by the base station regarding that the periodic SSB/DRS will not be transmitted actually in a certain period, it may be determined that the SSB/DRS will not be actually transmitted. If the UE determines that it is required to receive the SSB/DRS to achieve downlink synchronization or execute measurement, before the SSB/DRS, the UE may transmit the first request signaling to request the base station to transmit an SSB/DRB.

(2) Information indicated by the base station regarding that the base station enters the dormant state, the reference signal for downlink synchronization being muted when the base station is in the dormant state.

In an example, based on the information indicated by the base station regarding that the base station enters the dormant state, it may be determined that the SSB/DRS will not be actually transmitted by the base station. As long as the base station is in the dormant power-saving state, the UE may assume that all SSBs/DRSs will not be actually transmitted during the dormancy of the base station. In an embodiment, if the UE determines that it is required to receive the SSB/DRS to achieve downlink synchronization or execute measurement, before the SSB/DRS, the UE may transmit the first request signaling to request the base station to transmit an SSB/DRB.

(3) Information of a dormant slot indicated by the base station, the reference signal for downlink synchronization that overlaps with the dormant slot being muted.

For example, based on the information of the dormant slot indicated by the base station, it may be determined that the SSB/DRS that overlaps with the dormant slot will not be actually transmitted by the base station. In another embodiment, the SSB/DRS that overlaps the dormant slot includes SSBs/DRSs that partially overlap with the dormant slot, SSBs/DRSs that completely overlap with the dormant slot, etc., which all will not be actually transmitted by the base station. Optionally, the dormant slot means that the base station will not transmit any signal in this slot. If the slot where an SSB/DRS (or a part of the SSB/DRS) is indicated as a dormant slot by the base station, the UE considers that the SSB/DRS will not be actually transmitted. In yet another embodiment, if the UE determines that it is required to receive the SSB/DRS to achieve downlink synchronization or execute measurement, before the SSB/DRS, the UE may transmit the first request signaling to request the base station to transmit an SSB/DRS.

In an embodiment of the disclosure, a first time-domain location of the reference signal for downlink synchronization is determined based on configuration information about the reference signal for downlink synchronization indicated by the base station. In an example, the time-domain location of the SSB/DRS is determined according to the configuration information about the SSB/DRS indicated by the base station.

In another embodiment of the disclosure, a second time-domain location of the first request signaling is determined based on configuration information about the first request signaling indicated by the base station. In an example, the time-domain location of the WUS is determined according to the configuration information about the WUS indicated by the base station, and the time-domain location of the SSB/DRS is determined according to the configuration information about the SSB/DRS indicated by the base station. The second time-domain location is directly indicated by the base station and not related to the first time-domain location. If the UE transmits the first request signaling, at a location of the first reference signal for downlink synchronization that satisfies the first preset gap after the first request signaling is transmitted, the UE may expect to receive a reference signal for downlink synchronization. In another example, an SSB/DRS may be expected to be received at the location of the first SSB/DRS. The first preset gap is used to reserve the reception processing time of the base station for the first request signaling and the preparation time for transmitting the reference signal for synchronization (e.g., SSB/DRS).

In yet another embodiment of the disclosure, the second time-domain location may be determined by the first time-domain location. For example, the time-domain location of the WUS may be determined by the time-domain location of the SSB/DRS. The second time-domain location is determined based on the first time-domain location and a time-domain offset relative to the first time-domain location indicated by the base station. For example, the base station indicates the time-domain offset of the WUS relative to the SSB/DRS, and the UE determines the time-domain location of the WUS according to the time-domain location of the SSB/DRS and the time-domain offset. The first time-domain location may be determined based on the configuration information about the reference signal for downlink synchronization indicated by the base station. In another example, the time-domain location of the SSB/DRS is determined according to the configuration information about the SSB/DRS indicated by the base station. In addition, the gap between the first request signaling and the reference signal for downlink synchronization is not less than the first preset gap. In an example, the gap between the WUS and the SSB/DRS is not less than the first preset gap. The first preset gap is used to reserve the reception processing time of the base station for the first request signaling and the preparation time of transmitting the reference signal for downlink synchronization. If the UE expects to receive the reference signal for downlink synchronization (e.g., SSB/DRS), the first request signaling is transmitted at a location with a preset offset before the reference signal for downlink synchronization, and then it is expected to receive the reference signal for downlink synchronization at the corresponding location of the reference signal for downlink synchronization. For example, it is expected to receive the SSB/DRS at the corresponding SSB/DRS location.

In still another embodiment of the disclosure, the first time-domain location may be determined by the second time-domain location. In an example, the time-domain location of the SSB/DRS transmitted by the base station that is woken up by the UE may be determined by the time-domain location of the WUS. Specifically, the first time-domain location is determined based on the second time-domain location and a time-domain offset relative to the second time-domain location indicated by the base station. In another example, the base station indicates the time-domain offset of the SSB/DRS transmitted by the base station after being woken up relative to the WUS, and the UE determines the time-domain location of the SSB/DRS according to the time-domain location of the WUS and the time-domain offset. The second time-domain location is determined based on the configuration information about the first request signaling indicated by the base station. For example, the time-domain location of the WUS is determined according to the configuration information about the WUS indicated by the base station. Additionally, the gap between the first request signaling and the reference signal for downlink synchronization is not less than the first preset gap. For example, the gap between the WUS and the SSB/DRS is not less than the first preset gap. The first preset gap is used to reserve the reception processing time of the base station for the first request signaling and the preparation time of transmitting the reference signal for downlink synchronization. If the UE transmits the first request signaling, the UE expects to receive a reference signal for downlink synchronization at a location with a preset offset after transmitting the first request signaling. In an example, if the UE transmits the WUS, the UE expects to receive an SSB/DRS at a location with the preset offset after transmitting the WUS.

In one embodiment of the disclosure, the request signaling is used for requesting the base station to transmit the reference signal for downlink synchronization in N consecutive cycles. For example, the UE transmits a WUS to wake up the base station to transmit an SSB/DRS in N consecutive cycles, where the N is a positive integer. The value of N may be predefined or preconfigured, and being preconfigured may be interpreted as being configured by the base station. This is because the UE needs to continuously receive at least N SSBs to achieve the measurement accuracy under certain measurement events. The value of N may also be related to the capability of the UE. The UE may also report the capability relate to the value of N to the base station, that is, the value of N may be reported by the UE.

In another embodiment of the disclosure, considering that the base station may miss the request signaling transmitted by the UE, for the received signal at the location where the SSB/DRS is expected to be received, it is first determined based on energy detection whether the base station actually transmits the SSB/DRS. In an example, the UE compares the signal to interference plus noise ratio (SINR) or the signal to noise ratio (SNR) of the received signal with a preset threshold; if the SINR or the SNR exceeds the threshold, the UE determines that the base station actually transmits the SSB/DRS, and then obtains the downlink synchronization and/or measurement result based on the received signal; and if the SINR or the SNR does not the threshold, the UE determines that the base station does not actually transmit the SSB/DRS, and may attempt to transmit a request signaling again.

In yet another embodiment of the disclosure, a request signaling is transmitted on a primary cell (PCell) to request the base station to transmit at least one downlink signal on a secondary cell (SCell). It is possible to transmit a first request signaling on the PCell to request the base station to transmit a reference signal for downlink synchronization on the SCell. In an example, in the scenario of carrier aggregation, the UE may request the base station to transmit an SSB/DRS on the SCell through a request signaling on the PCell. For example, requesting the base station to transmit an SSB/DRS on the SCell through a medium access control (MAC) control element (CE) and/or PUCCH. After a preset gap of transmitting the request signaling on the PCell, the UE expects to receive an SSB/DRS on the SCell.

In one embodiment of the disclosure, similar to the UE requesting the base station to transmit an SSB/DRS through a request signaling, the UE may also request the base station to transmit (but not limited to) channel state information reference signal (CSI-RS), positioning reference signal (PRS), paging occasion (PO), SIB1, other system information (OSI), etc., through a request signaling.

In another embodiment of the disclosure, the UE may request the base station to receive a specific uplink signal and/or channel through a request signaling.

When there is uplink data arriving at the UE but the PRACH is muted, a second request signaling is transmitted to the base station to request the base station to receive a PRACH and respond to a random access process imitated by the UE; and after a second preset threshold of transmitting the second request signaling, a PRACH is transmitted to the base station.

FIG. 6 is a schematic diagram of requesting, by a UE and through a signaling, a base station to receive a PRACH and respond to a random access process according to an embodiment of the disclosure.

In an embodiment of the disclosure, if there is uplink data arriving at the UE but the base station enters the dormant state and cannot monitor the PRACH, referring to FIG. 6, the UE may wake up the dormant base station through the second request signaling to monitor the PRACH on a specific RACH occasion (RO). For example, the UE may transmit the second request signaling before the muted PRACH, to wake up the base station to receive the PRACH and respond to the random access initiated by the UE. Upon transmitting the second request signaling, the UE may transmit a PRACH to the base station after a second preset gap.

In another embodiment of the disclosure, the PRACH being muted is determined based on at least one of the following information.

(1) Information indicated by the base station regarding that a periodic PRACH is muted at a specific occasion.

In an example, based on the information indicated by the base station regarding that a periodic RO is muted in a certain period. In an embodiment, if there is uplink data arriving at the UE, the UE may transmit a second request signaling before the muted RO, to request the base station to receive the PRACH and respond to the random access initiated by the UE.

(2) Information indicated by the base station regarding that the base station enters the dormant state, the PRACH being muted when the base station is in the dormant state.

In an example, based on the information indicated by the base station regarding that the base station enters the dormant power-saving state, it may be determined that an RO is muted. As long as the base station is in the dormant power-saving state, the UE may assume that all ROs are muted during the dormancy of the base station, that is, the PRACH will not be monitored by the base station. In another embodiment, if there is uplink data arriving at the UE, the UE may transmit a second request signaling before the muted RO, to request the base station to receive the PRACH and respond to the random access initiated by the UE.

(3) Information of a dormant slot indicated by the base station, the PRACH that overlaps with the dormant slot being muted.

In an example, based on the information of the dormant slot indicated by the base station, it may be determined that an RO is muted. The dormant slot means that the base station will not receive any signal in this slot. In another embodiment, if the slot where an RO is indicated as a dormant slot by the base station, the UE considers that this RO is muted. If there is uplink data arriving at the UE, the UE may transmit a second request signaling before the muted RO, to request the base station to receive the PRACH and respond to the random access initiated by the UE.

In yet another embodiment of the disclosure, a third time-domain location where the base station receives the PRACH is determined based on configuration information about the PRACH indicated by the base station. For example, the time-domain location of the PRACH is determined according to the configuration information about the PRACH indicated by the base station.

In one embodiment of the disclosure, a fourth time-domain location of the second request signaling is determined based on the configuration information about the second request signaling indicated by the base station. In an example, the time-domain location of the WUS is determined according to the configuration information about the WUS indicated by the base station, and the time-domain location of the PRACH is determined according to the configuration information about the PRACH indicated by the base station. The fourth time-domain location is directly indicated by the base station and not related to the third time-domain location. In an embodiment, if the UE transmits the second request signaling, at a location of the first PRACH that satisfies a second preset gap after the second request signal (e.g., WUS) is transmitted, the UE may expect to transmit a PRACH. The second preset gap is used to reserve the reception processing time of the base station for the second request signaling and the preparation time of receiving the PRACH.

In another embodiment of the disclosure, the fourth time-domain location may be determined by the third time-domain location. For example, the time-domain location of the WUS may be determined by the time-domain location of the PRACH. Specifically, the fourth time-domain location is determined based on the third time-domain location and a time-domain offset relative to the third time-domain location indicated by the base station. In an example, the base station indicates the time-domain offset of the WUS relative to the PRACH, and the UE determines the time-domain location of the WUS according to the time-domain location of the PRACH and the time-domain offset. The third time-domain location is determined according to the configuration information about the PRACH indicated by the base station. In addition, the gap between the second request signaling (e.g., WUS) and the PRACH is not less than the second preset gap. In yet another embodiment, the second preset gap is used to reserve the reception processing time of the base station for the second request signaling and the preparation time of receiving the PRACH. If the UE expects to transmit a PRACH, the second request signaling is transmitted at a location with a preset offset before the PRACH, and it is expected to transmit the PRACH at the corresponding PRACH location.

In an embodiment of the disclosure, the third time-domain location may be determined by the fourth time-domain location. In an example, the time-domain location of the PRACH received by the base station that is woken up by the UE may be determined by the time-domain location of the WUS. Specifically, the third time-domain location is determined based on the fourth time-domain location and a time-domain offset relative to the fourth time-domain location indicated by the base station. In another example, the base station indicates the time-domain offset of the PRACH received by the base station after being woken up relative to the WUS, and the UE determines the time-domain location of the PRACH according to the time-domain location of the WUS and the time-domain offset. The fourth time-domain location is determined based on the configuration information about the second request signaling indicated by the base station. In yet another example, the time-domain location of the WUS is determined according to the configuration information about the WUS indicated by the base station. In addition, the gap between the second request signaling (e.g., WUS) and the PRACH is not less than the second preset gap. The second preset gap is used to reserve the reception processing time of the base station for the WUS and the preparation time of transmitting the PRACH. If the UE transmits the second request signaling, the UE expects to transmit the PRACH at a location with the preset offset after transmitting the second request signaling.

In one embodiment of the disclosure, the UE may transmit a request signaling on a PCell to request the base station to receive at least one uplink signal on a SCell. In an example, a second request signaling is transmitted on the PCell to request the base station to receive a specific uplink signal and/or channel on a specific SCell. For example, in the scenario of carrier aggregation, the UE may request the base station to receive the PRACH on the SCell and respond to the random access process initiated by the UE through a request signaling on the PCell, for example, requesting to carry this request signaling through an MAC CE or PUCCH. After a preset gap of transmitting the request signaling on the PCell, the UE transmits the PRACH on the SCell.

In another embodiment of the disclosure, similar to requesting the base station to receive a PRACH through a request signaling, the UE may also request the base station receive (but not limited to) a scheduling request (SR), a periodic channel state information (CSI) report, a configured grant physical uplink shared channel (CG-PUSCH), etc., through a request signaling.

Figure 7:
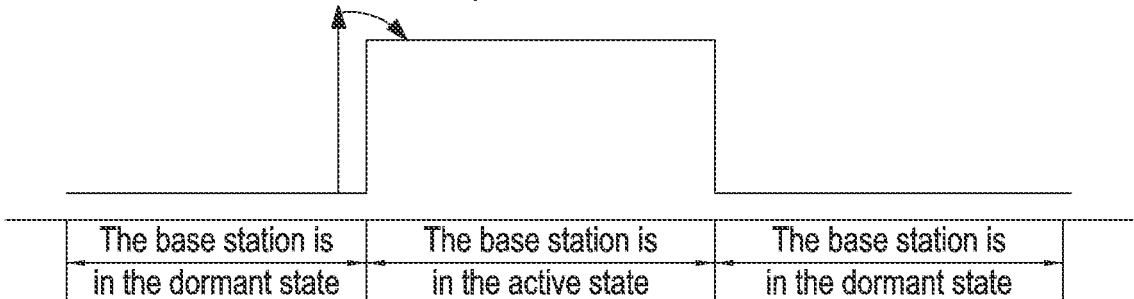
FIG. 7 is a schematic diagram of requesting, by a UE and through a signaling, a base station to enter an active state and last for a period of time according to an embodiment of the disclosure.

FIG. 7 is a schematic diagram of requesting, by a UE and through a signaling, a base station to enter an active state and last for a period of time according to an embodiment of the disclosure.

Referring to FIG. 7, in the embodiment of the disclosure, if the base station is in the dormant state, the UE may request the base station to enter an active state (equivalent to waking up the dormant base station) or request the base station to enter the active state and last for a period of time through a request signaling.

When there is uplink data arriving at the UE but the base station is in the dormant state, a third request signaling is transmitted to the base station to request the base station to enter the active state or request the base station to enter the active state and last for a preset duration of time, and the base station is expected to enter the active state after a third preset gap of transmitting the third request signaling.

In one embodiment of the disclosure, after being woken up, the base station normally transmits or receives all configured periodic signals/channels, that is, the periodic signals/channels configured by the base station before entering the dormant state are all reactivated. In another embodiment, the base station entering the active state performs at least one of the following operations: periodically transmitting the reference signal for downlink synchronization; periodically receiving the PRACH; periodically transmitting a broadcast channel and/or configured unicast channel; and periodically receiving the configured uplink channel, etc. For example, after the base station has monitored the WUS, the base station enters the active state and lasts for a period of time (i.e., a preset duration of time). In this period of time, the base station normally transmits at least one of periodic paging occasions (POs), SIB1, other system information (OSI), channel state information-reference signals (CSI-RSs) and semi-persistent scheduling physical downlink shared channels (SPS-PDSCHs), or receives at least one of periodic PRACHs, SRs, SG-PUSCHs, sounding reference signals (SRSs) and CSI reports.

Optionally, the base station entering the active state and the duration (i.e., the preset duration of time) are predefined, and/or configured by the base station. For example, the duration may be a radio frame. After the duration, if the UE has no uplink data that is being transmitted or to be transmitted, the UE may assume that the base station enters the energy and power saving state again.

Or, within the duration (the preset duration of time), the base station may indicate the base station to enter the energy and power saving state in advance through an instruction. That is, within the duration (the preset duration of time), a UE may receive the information indicated by the base station regarding that the base station enters the dormant state in advance. Or, within the duration (the preset duration of time), the base station may indicate the base station to extend the active state through an instruction. That is, within the duration (the preset duration of time), a UE may receive the information indicated by the base station regarding that the base station will extend the active state.

In one embodiment of the disclosure, a plurality of resources is configured to transmit the third request signaling, and each resource corresponds to a different length of time duration. For example, the system may configure a plurality of WUS resources, and the WUSs on different resources request the base station to enter the active state and last for different lengths of time duration. The UE may select, according to different requirements, one WUS resource to request the base station to enter the active state and last for the corresponding period of time. The transmitting the third signaling to the base station includes: transmitting the third request signaling to the base station through one of the plurality of resources, to request the base station to enter the active state and last for the duration of time corresponding to the resource.

In another embodiment of the disclosure, the UE may transmit a request signaling (e.g., the third request signaling) on the PCell to request a specific SCell to enter the active state or to enter the active state and last for a preset duration of time. In an example, in the scenario of carrier aggregation, the UE may request the base station to active a specific SCell through a request signaling on the PCell, for example, carrying this request signaling through an MAC CE and/or PUCCH. After a third preset gap of transmitting the request signaling on the PCell, the UE may assume that the corresponding SCell enters the active state.

In yet another embodiment of the disclosure, the UE may determine the dormant state of the base station according to the state configuration information of the base station. The dormant state may also be referred to as an OFF state, a non-active state, a power-saving state, a dormant power-saving state, an energy and power saving state, etc.; while the active state may also be referred to as an ON state, an active state, a discontinuous transmission activation period, a non-dormant state, a non-power-saving state, a non-dormant power-saving state, etc. Optionally, the state configuration information of the base station may include the state period of the base station and/or the length of the duration of the dormant state in each period and/or the length of the duration of the active state in each period.

In still another embodiment of the disclosure, the base station being in the active state and/or the dormant state may be configured through a semi-static signaling, for example, being configured through a system message, or being configured through a UE-specific RRC signaling. Or, the base station may also indicate the base station to enter the dormant state through a dynamic signaling. However, it is not limited thereto.

In an embodiment of the disclosure, the UE has different behaviors in the active state and the dormant state of the base station. No matter whether the switching between the ON state and the dormant stat of the base station discontinuous transmission (DTX) is configured through a semi-static signaling or dynamically indicated by the base station, the behaviors of the UE in the active state of the base station may be the same or different, and the behaviors of the UE in the dormant state of the base station may be the same or different.

In another embodiment of the disclosure, UEs in the RRC connected state and UEs in the RRC non-connected state (including UEs in the RRC idle state and/or UEs in the RRC non-active state) all may request the base station to transmit an SSB/DRS, receive a PRACH or enter an active state through a request signaling (e.g., WUS); or, only UEs in the RRC connected state may request the base station to transmit an SSB/DRS, receive a PRACH or enter an active state through a WUS; or, only UEs in the RRC non-connected state may request the base station to transmit an SSB/DRS, receive a PRACH or enter an active state through a WUS.

Specifically, in yet another embodiment of the disclosure, the UE in the RRC non-connected state may have at least one of the following UE behaviors in the dormant state of the base station.

(1) The UE does not expect to receive any downlink broadcast signaling. In an example, the UE does not expect to receive at least one of SSBs, POs, SIB1 and OSI.

(2) The UE does not initiate the random access process, that is, the UE does not transmit PRACHs.

(3) The UE receives the downlink broadcast signaling (i.e., at least one of SSBs, POs, SIB1 and OSI) based on a relatively sparse period. The transmission of the downlink broadcast signaling in the dormant state is sparser than that in the active state.

(4) The UE determines an available PRACH transmission occasion based on a relatively sparse period. The transmission of the PRACH in the dormant state is sparser than that in the active state.

In an embodiment of the disclosure, the UE in the RRC connected state may have at least one of the following UE behaviors in the dormant state of the base station.

(1) The UE does not monitor PDCCHs, including PDCCHs in any search space.

(2) The UE determines whether to monitor PDCCHs according to the network configuration. That is, it may be configured by the network whether the UE monitors PDCCHs. In an example, it is configured through a high-layer signaling whether to monitor PDCCHs.

(3) The UE does not monitor PDCCHs in the UE-specific search space (USS) and PDCCHs on the Type 3 common search space (CCS), but needs to monitor PDCCHs in other search spaces.

(4) The UE determines, according to the network configuration, a search space where the PDCCH to be monitored is located, and does not need to monitor the PDCCHs in other search spaces. In an example, the search space of the PDCCH to be monitored is configured through a high-layer signaling.

(5) The UE stops the running discontinuous reception (DRX) timers, for example, stopping all running DRX timers. In other words, the UE stops monitoring PDCCHs.

(6) The UE does not start the DRX-onDurationTimer at the start location of the DRX period. In an example, the UE does not start the DRX-onDurationTimer at the start location of each DRX period.

(7) The UE determines, according to the high-layer signaling configuration and/or the indication of the wake up signal, whether to start the DRX-onDurationTimer at the start location of the specific DRX period. It may be configured through the high-layer signal or indicated by the wake up signal whether the UE starts the DRX-onDurationTimer.

(8) The UE does not receive any downlink broadcast signaling, for example, at least one of SSBs, POs, SIB1 and OSI.

(9) The UE determines, according to the network configuration, whether to receive the downlink broadcast signaling, for example, at least one of SSBs, POs, SIB 1 and OSI. That is, it may be configured by the network whether the UE may receive the downlink broadcast signaling. In an example, it is configured through the high-layer signaling whether the UE may receive the downlink broadcast signaling.

(10) The UE does not initiate the random access process, that is, the UE does not transmit PRACHs, except for PRACHs triggered by PDCCH order.

(11) The UE determines, according to the network configuration, whether to transmit a PRACH to initiate the random access process. It is configured by the network whether to initiate the random access process. For example, it is configured through the high-layer signaling whether to transmit the PRACH.

(12) The UE receives downlink periodic signals/channels based on a relatively sparse period, including broadcast signals/channels, and/or unicast signals/channels, for example, including at least one of SSBs, CSI-RSs, PRSs, PDCCHs and SPS-PDSCHs. The transmission of these downlink periodic signals/channels in the dormant state is sparser than that in the active state.

(13) The UE transmits uplink periodic signals/channels based on a relatively sparse period, including at least one of PRACHs, SRs, periodic CSI reports, SRSs and CG-PUSCHs. The transmission of these uplink periodic signals/channels in the dormant state is sparser than that in the active state.

In an embodiment of the disclosure, the request signaling may be configured through the system information. For example, the WUS used for waking up the base station to transmit an SSB/DRS, receive a PRACH or enter an active state may be configured through the system information. All UEs having the WUS capability in a cell may share the same WUS configuration. In other words, multiple UEs may simultaneously transmit the same WUS on the same resource, to request the base station to transmit an SSB/DRS, receive a PRACH or enter an active state, etc.

In another embodiment of the disclosure, the request signaling may be configured through a UE-specific RRC signaling. For example, the WUS used for waking up the base station to transmit an SSB/DRS, receive a PRACH or enter an active state is only used for a specific UE. For example, the WUS is configured for a specific UE by the base station through a UE-specific RRX signaling. The base station may configure WUSs for some UEs with a higher priority.

In yet another embodiment of the disclosure, the request signaling may be used under a specific condition. For example, at least one of the following conditions is satisfied.

(1) The UE transmits a request signaling only when there is data arriving in a specific logical channel, but cannot transmit the request signaling to wake up the base station even if there is arriving in other logical channels. The transmitting, by the UE, a request signaling to the base station includes: when there is uplink data arriving at the UE on a preset logical channel, transmitting the request signaling to the base station. In an example, if there is uplink data arriving at the UE and the logical channel where the data to be transmitted is located is predefined or preconfigured, it is allowed to wake up the logical channel of the base station.

(2) There is uplink data arriving at the UE, and the latest available SSB/DRS and/or PRACH does not satisfy the delay requirement of the arrived data. The transmitting, by the UE, a request signaling to the base station includes: when there is uplink data arriving at the UE and the latest available PRACH transmission cannot satisfy the delay requirement of the arrived data, transmitting the request signaling to the base station. In an embodiment, the UE may determine, through the actual implementation, whether the latest available SSB/DRS and/or PRACH satisfies the delay requirement of the arrived data.

(3) There is uplink data arriving at the UE, and the priority of the data exceeds a preset threshold. The transmitting, by the UE, a request signaling to the base station includes: when there is uplink data arriving at the UE and the priority of the arrived data is greater than a priority threshold, transmitting the request signaling to the base station. In another embodiment, the UE may determine, through the implementation, whether the priority of the arrived data exceeds the preset threshold.

In an embodiment of the disclosure, it is also possible to receive acknowledgment (ACK) information transmitted by the base station after the request signaling is transmitted to the base station, and expect at least one of the following situations after a fourth preset gap of receiving the acknowledgment information: receiving at least one downlink signal; transmitting at least one uplink signal; and allowing the base station to enter the active state. In an example, the base station transmits the ACK information for the WUS used for waking up the base station to transmit an SSB/DRS, receive a PRACH or enter an active state. Only when the UE has received the corresponding ACK after transmitting the WUS, the UE expects to receive the SSB/DRS, transmit the PRACH, or assume that the base station enters the active state. Otherwise, the UE considers that the base station is not woken up successfully, and the UE may continuously transmit a WUS to wake up the base station at a next WUS transmission occasion.

In accordance with the method provided in the embodiments of the disclosure, when a UE has a communication demand, the UE may wake up a dormant base station through signaling, to request the base station to enter an active state, transmit a specific downlink signal/channel or receive a specific uplink signal/channel, etc., so that the balance between the dormancy of the base station and the user experience is achieved, the influence of the dormancy of the base station on the user experience and transmission delay is reduced, and the user experience is improved.

An embodiment of the disclosure further provides a method executed by a base station in a communication system, including the following.

At operation S101, a request signaling transmitted by a UE is received, and at least one of the following operations is executed: transmitting at least one downlink signal; receiving at least one uplink signal; and entering an active state.

Similarly, the method provided in the embodiment of the disclosure corresponds to the method in the embodiments on the UE side, and the detailed functional descriptions and the achieved beneficial effects may specifically refer to the above descriptions of the corresponding method in the embodiments on the UE side and will not be repeated here.

An embodiment of the disclosure provides a user equipment. The user equipment may specifically include a request module (also referred to as a transmitting module), wherein the request module is configured to transmit a request signaling to a base station to request the base station to execute at least one of the following operations:

transmitting at least one downlink signal;

receiving at least one uplink signal; and entering an active state.

Optionally, the base station includes a base station in a dormant state, and the base station in the dormant state includes at least one of the following situations:

not transmitting the at least one downlink signal;

not receiving the at least one uplink signal;

not transmitting downlink signals; and not receiving uplink signals except for the request signaling.

Optionally, the request module is specifically configured to transmit a first request signaling to the base station to request the base station to transmit a reference signal for downlink synchronization.

Optionally, the request module is specifically configured to: transmit the first request signaling to the base station, when there is uplink data arriving at the UE, but the downlink is out of synchronization and the reference signal for downlink synchronization is muted.

Optionally, after a first preset gap of transmitting the first request signaling, it is expected to receive the reference signal for downlink synchronization.

Optionally, the reference signal for downlink synchronization includes at least one of the following:

an SSB;

a DRS, the DRS having more physical resource elements used for reference signal mapping than the SSB; and an NCD-SSB.

Optionally, the reference signal for downlink synchronization being muted is determined based on at least one of the following information:

information indicated by the base station regarding that the reference signal for downlink synchronization is muted at a specific occasion;

information indicated by the base station regarding that the base station enters the dormant state, the reference signal for downlink synchronization being muted when the base station is in the dormant state; and information of a dormant slot indicated by the base station, the reference signal for downlink synchronization that overlaps with the dormant slot being muted.

Optionally, a first time-domain location of the reference signal for downlink synchronization is determined based on configuration information about the reference signal for downlink synchronization indicated by the base station; and/or, a second time-domain location of the first request signaling is determined based on configuration information about the first request signaling indicated by the base station; and/or, the second time-domain location is determined based on the first time-domain location and a time-domain offset relative to the first time-domain location indicated by the base station; and/or, the first time-domain location is determined based on the second time-domain location and a time-domain offset relative to the second time-domain location indicated by the base station.

Optionally, the request signaling is used for requesting the base station to transmit the reference signal for downlink synchronization in N consecutive cycles, where the N is a positive integer.

Optionally, the request module is specifically configured to transmit a second request signaling to the base station to request the base station to receive a PRACH.

Optionally, the request module is specifically configured to transmit the second request signaling to the base station when there is uplink data arriving at the UE but the PRACH is muted.

Optionally, the user equipment further includes a transmitting module configured to transmit the PRACH to the base station after a second preset gap of transmitting the second request signaling.

Optionally, the PRACH being muted is determined based on at least one of the following information:

information indicated by the base station regarding that a periodic PRACH is muted at a specific occasion;

information indicated by the base station regarding that the base station enters the dormant state, the PRACH being muted when the base station is in the dormant state; and information of a dormant slot indicated by the base station, the PRACH that overlaps with the dormant slot being muted.

Optionally, a third time-domain location where the base station receives the PRACH is determined based on configuration information about the PRACH indicated by the base station; and/or, a fourth time-domain location of the second request signaling is determined based on configuration information about the second request signaling indicated by the base station; and/or, the fourth time-domain location is determined based on the third time-domain location and a time-domain offset relative to the third time-domain location indicated by the base station; and/or, the third time-domain location is determined based on the fourth time-domain location and a time-domain offset relative to the fourth time-domain location indicated by the base station.

Optionally, the request module is specifically configured to transmit a third request signaling to the base station to request the base station to enter the active state, or to request the base station to enter the active state and last for a preset duration of time.

Optionally, the request module is specifically configured to transmit the third request signaling to the base station when there is uplink data arriving at the UE but the base station is in the dormant state.

Optionally, after a third preset gap of transmitting the third request signaling, it is expected that the base station enters the active state.

Optionally, the base station entering the active state performs at least one of the following operations:

periodically transmitting the reference signal for downlink synchronization;

periodically receiving the PRACH;

periodically transmitting a broadcast channel and/or configured unicast channel;

periodically receiving the configured uplink channel.

Optionally, the user equipment further includes a receiving module configured to: in a preset duration of time, receive information indicated by the base station regarding that the base station enters the dormant state in advance; and/or, in a preset duration of time, receive information indicated by the base station regarding that the base station will extend the active state.

Optionally, a plurality of resources is configured to transmit the third request signaling, and each resource corresponds to a different length of time duration; and the request module is specifically configured to transmit the third request signaling to the base station through one of the plurality of resources, to request the base station to enter the active state and last for the duration of time corresponding to the resource.

Optionally, the request module is specifically configured to transmit the request signaling on a primary cell to request the base station to perform at least one of the following operations on a secondary cell:

transmitting at least one downlink signal;

receiving at least one uplink signal; and entering an active state.

Optionally, the request module is specifically used in at least one of the following ways:

transmitting the request signaling to the base station through a physical uplink control channel (PUCCH); and transmitting the request signaling to the base station through a physical signal sequence.

Optionally, the request signaling is configured through system information; and/or the request signaling is configured through a UE-specific RRC signaling.

Optionally, the request module is specifically used in at least one of the following situations:

when there is uplink data arriving at the UE on a preset logical channel, transmitting the request signaling to the base station;

when there is uplink data arriving at the UE and the latest available PRACH transmission cannot satisfy the delay requirement of the arrived data, transmitting the request signaling to the base station; and when there is uplink data arriving at the UE and the priority of the arrived data is greater than a priority threshold, transmitting the request signaling to the base station.

Optionally, the receiving module is further configured to: receive acknowledgment information transmitted by the base station after the request signaling is transmitted to the base station, and expect at least one of the following situations after a fourth preset gap of receiving the acknowledgment information:

receiving at least one downlink signal;

transmitting at least one uplink signal; and allowing the base station to enter an active state.

Another embodiment of the disclosure further provides a base station. The base station may include a receiving module configured to receive a request signaling transmitted by a UE and execute at least one of the following operations: transmitting at least one downlink signal; receiving at least one uplink signal; and entering an active state.

The user equipment and the base station provided in the embodiments of the disclosure can execute the methods provided in the embodiments of the disclosure, and the implementation principles thereof are similar. The acts executed by the modules in the user equipment and the base station provided in the embodiment of the disclosure correspond to the steps in the methods provided in the embodiments of the disclosure. The detailed functional descriptions of the modules in the user equipment and the base station and the achieved beneficial effects can refer to the descriptions of the corresponding methods described above and will not be repeated here.

Provided in embodiments of the disclosure is an electronic device including: a transceiver for transmitting and receiving signals; and a processor, coupled to the transceiver and configured to perform to implement the steps of each of the preceding method embodiments. The electronic device may be a UE, and the processor in the electronic device is configured to control to implement the steps of the method executed by a UE provided in the method embodiments. Optionally, the electronic device may be a base station, and the processor in the electronic device is configured to control to implement the steps of the method executed by a base station provided in the method embodiments.

Figure 8:
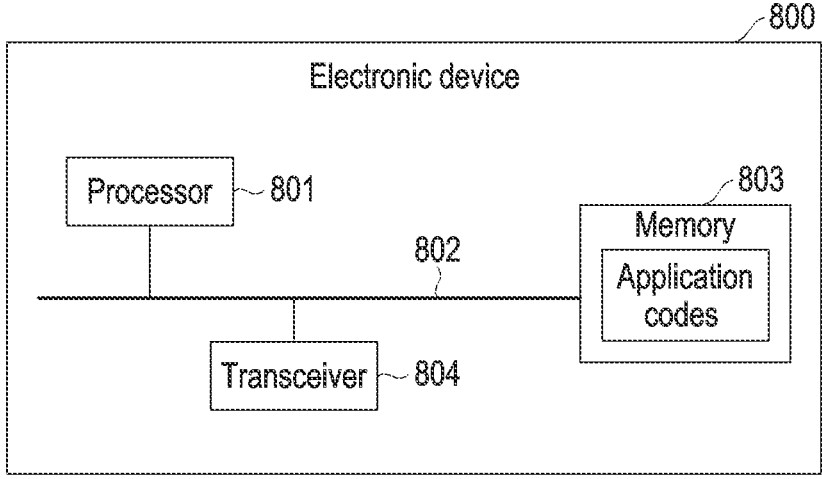
FIG. 8 is a schematic structure diagram of an electronic device according to an embodiment of the disclosure.

FIG. 8 is a schematic structure diagram of an electronic device according to an embodiment of the disclosure.

In an optional embodiment, there is provided an electric apparatus, as shown in FIG. 8. Referring to FIG. 8, an electric device 800 includes: a processor 801 and a memory 803. Wherein, the processor 801 communicates with the memory 803, e.g., via a bus 802. Optionally, the electronic device 800 may also include a transceiver 804, which may be used for data interaction between this electronic device and other electronic devices, such as data transmission and/or data reception. It is to be noted that, in practical applications, the number of the transceiver 804 is not limited to one, and the structure of the electronic device 800 does not constitute any limitation to the embodiments of the disclosure.

In an embodiment, the processor 801 may be a central processing unit (CPU), a general-purpose processor, a digital signal processor (DSP), an application specific integrated circuit (ASIC), a field programmable gate array (FPGA) or other programmable logic devices, a transistor logic device, a hardware component or any combination thereof. It is possible to implement or execute the various logical blocks, modules and circuits described in combination with the disclosures of the disclosure. The processor 801 may also be a combination of computing functions, such as a combination of one or more microprocessor, a combination of a DSP and a microprocessor, and so on.

In another embodiment, the bus 802 may include a path for delivering information among the above components. The bus 802 may be a peripheral component interconnect (PCI) bus, an extended industry standard architecture (EISA) bus, etc. The bus 802 may be divided into an address bus, a data bus, a control bus, and so on. For ease of representation, the bus is represented by only one bold line in FIG. 8, but it does not mean that there is only one bus or one type of buses.

In yet another embodiment, the memory 803 may be a read only memory (ROM) or other types of static storage devices that may store static information and instructions, a random access memory (RAM) or other types of storage devices that may store information and instructions. The memory 803 may also be electrically erasable programmable read only memory (EEPROM), compact disc read only memory (CD-ROM) or other optical disk storage, optical disk storage (including compressed compact disc, laser disc, compact disc, digital versatile disc, blue-ray disc, etc.), magnetic disk storage medium or other magnetic storage device, or any other medium capable of carrying or storing computer programs and capable of being accessed by a computer, but not limited to this.

The memory 803 may be configured to store compute programs for executing the embodiments of the disclosure, and is controlled and executed by the processor 801. The processor 801 is used to execute the computer program stored in the memory 803 to implement the steps shown in the preceding method embodiment.

An embodiment of the disclosure provides a computer-readable storage medium storing computer programs that, when executed by a processor, can implement the steps and corresponding contents in the above method embodiments.

Another embodiment of the disclosure further provides a computer program product, including computer programs that, when executed by a processor, can implement the steps and corresponding contents in the above method embodiments.

The terms "first", "second", "third", "fourth", "1", "2", etc. (if any), in the specification and claims of the disclosure and the accompanying drawings are used for distinguishing similar objects, rather than describing a particular order or precedence. It is to be understood that the data so used are interchangeable under appropriate circumstances such that the embodiments of the disclosure described herein are capable of operation in other sequences than described or illustrated herein.

It should be understood that, although various operational steps are indicated by arrows in the flowcharts of embodiments of the disclosure, the order in which the steps are performed is not limited to the order indicated by the arrows. Unless explicitly stated herein, in some implementation scenarios of embodiments of the disclosure, the implementation steps in the respective flowcharts may be performed in other order as required. In addition, some or all of the steps in each flowchart may include multiple sub-steps or multiple stages based on actual implementation scenarios. Some or all of these sub-steps or phases may be executed at the same moment, and each of these sub-steps or phases may also be executed separately at different moments. When each of these sub-steps or stages is executed at a different moment, the execution order of these sub-steps or stages may be flexibly configured as required, and will not be limited in the embodiments of the disclosure.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method executed by a user equipment (UE) in a communication system, the method comprising:

identifying that there is uplink data arriving at the UE, but a downlink is out of synchronization and a reference signal for downlink synchronization is muted;

transmitting, to a base station, a first request signaling to request the base station to transmit the reference signal for downlink synchronization;

transmitting, to the base station, a second request signaling to request the base station to receive a physical random access channel (PRACH); and transmitting, to the base station, a third request signaling to request the base station to enter the active state.

2. The method according to claim 1, wherein the base station comprises a base station in a dormant state, and wherein the base station in the dormant state comprises at least one of the following situations:

not transmitting the at least one downlink signal, not receiving the at least one uplink signal, not transmitting downlink signals, and not receiving uplink signals except for the request signaling.

3. The method according to claim 1, wherein the reference signal for downlink synchronization comprises at least one of the following:

a synchronization signal block (SSB), a discovery reference signal (DRS), the DRS having more physical resource elements used for reference signal mapping than the SSB, and a non-cell defining SSB (NCD-SSB).

4. The method according to claim 1, wherein the reference signal for downlink synchronization being muted is determined based on at least one of the following information:

information indicated by the base station regarding that the reference signal for downlink synchronization is muted at a specific occasion, information indicated by the base station regarding that the base station enters a dormant state, the reference signal for downlink synchronization being muted when the base station is in the dormant state, and information of a dormant slot indicated by the base station, the reference signal for downlink synchronization that overlaps with the dormant slot being muted.

5. The method according to claim 1, wherein a first time-domain location of the reference signal for downlink synchronization is determined based on configuration information about the reference signal for downlink synchronization indicated by the base station, and/or, wherein a second time-domain location of the first request signaling is determined based on configuration information about the first request signaling indicated by the base station, and/or, wherein the second time-domain location is determined based on the first time-domain location and a time-domain offset relative to the first time-domain location indicated by the base station, and/or wherein the first time-domain location is determined based on the second time-domain location and a time-domain offset relative to the second time-domain location indicated by the base station.

6. The method according to claim 1, wherein the request signaling is used for requesting the base station to transmit the reference signal for downlink synchronization in N consecutive cycles, where the N is a positive integer.

7. The method according to claim 1, wherein the transmitting of the second request signaling to the base station comprises:

when there is uplink data arriving at the UE but the PRACH is muted, transmitting the second request signaling to the base station.

8. The method according to claim 1, wherein the PRACH being muted is determined based on at least one of the following information:

information indicated by the base station regarding that a periodic PRACH is muted at a specific occasion, information indicated by the base station regarding that the base station enters a dormant state, the PRACH being muted when the base station is in the dormant state, and information of a dormant slot indicated by the base station, the PRACH that overlaps with the dormant slot being muted.

9. The method according to claim 1, wherein a third time-domain location where the base station receives the PRACH is determined based on configuration information about the PRACH indicated by the base station, and/or, wherein a fourth time-domain location of the second request signaling is determined based on configuration information about the second request signaling indicated by the base station, and/or wherein the fourth time-domain location is determined based on the third time-domain location and a time-domain offset relative to the third time-domain location indicated by the base station, and/or, wherein the third time-domain location is determined based on the fourth time-domain location and a time-domain offset relative to the fourth time-domain location indicated by the base station.

10. The method according to claim 1, wherein the transmitting of the third request signaling to the base station comprises:

when there is uplink data arriving at the UE but the base station is in a dormant state, transmitting the third request signaling to the base station.

11. The method according to claim 1, wherein a plurality of resources is configured to transmit the third request signaling, and each resource corresponds to a different length of time duration, and wherein the transmitting a third signaling to the base station comprises:

transmitting the third request signaling to the base station through one of the plurality of resources, to request the base station to enter the active state and last for the duration of time corresponding to the resource.

12. The method according to any one of claim 1, wherein the transmitting of the request signaling to the base station comprises:

transmitting the request signaling on a primary cell to request the base station to perform at least one of the following operations on a secondary cell:
transmitting the at least one downlink signal,
receiving the at least one uplink signal, and
entering an active state.

13. The method according to any one of claim 1, wherein the transmitting of the request signaling to the base station comprises at least one of the following situations:

when there is uplink data arriving at the UE on a preset logical channel, transmitting the request signaling to the base station;

when there is uplink data arriving at the UE and the latest available PRACH transmission cannot satisfy a delay requirement of the arrived data, transmitting the request signaling to the base station; and when there is uplink data arriving at the UE and a priority of the arrived data is greater than a priority threshold, transmitting the request signaling to the base station.

14. A method executed by a base station in a communication system, the method comprising:

receiving, from a user equipment (UE), a first request signaling to request the base station to transmit a reference signal for downlink synchronization in case that there is uplink data arriving at the UE, but a downlink is out of synchronization and the reference signal for downlink synchronization is muted;

receiving, from the UE, a second request signaling to request the base station to receive a physical random access channel (PRACH); and receiving, from the UE, a third request signaling to request the base station to enter the active state.

15. The method according to claim 14, wherein the reference signal for downlink synchronization comprises at least one of the following:

a synchronization signal block (SSB), a discovery reference signal (DRS), the DRS having more physical resource elements used for reference signal mapping than the SSB, and a non-cell defining SSB (NCD-SSB).

16. A user equipment (UE), comprising:

a transceiver; and at least one processor coupled to the transceiver and configured to control to:

identify that there is uplink data arriving at the UE, but a downlink is out of synchronization and a reference signal for downlink synchronization is muted, transmit, to a base station, a first request signaling to request the base station to transmit the reference signal for downlink synchronization, transmit, to the base station, a second request signaling to request the base station to receive a physical random access channel (PRACH), and transmit, to the base station, a third request signaling to request the base station to enter the active state.

17. The UE according to claim 16, wherein the base station comprises a base station in a dormant state, and wherein the base station in the dormant state comprises at least one of the following situations:

not transmitting the at least one downlink signal, not receiving the at least one uplink signal, not transmitting downlink signals, and not receiving uplink signals except for the request signaling.

18. A base station, comprising:

a transceiver; and a processor coupled to the transceiver and configured to control to:

receive, from a user equipment (UE), a first request signaling to request the base station to transmit a reference signal for downlink synchronization in case that there is uplink data arriving at the UE, but a downlink is out of synchronization and the reference signal for downlink synchronization is muted, receive, from the UE, a second request signaling to request the base station to receive a physical random access channel (PRACH), and receive, from the UE, a third request signaling to request the base station to enter the active state.

* * * * *